United States Patent [19]
Steen et al.

[11] Patent Number: 5,773,503
[45] Date of Patent: Jun. 30, 1998

[54] COMPACTED MINERAL FILLER PELLET AND METHOD FOR MAKING THE SAME

[75] Inventors: William P. Steen, Littleton; David R. Bloomfield, Castlerock, both of Colo.

[73] Assignee: Luzenac America, Inc., Englewood, Colo.

[21] Appl. No.: 764,619

[22] Filed: Dec. 11, 1996

[51] Int. Cl.$^6$ .............................. C08K 3/34; C09C 1/02
[52] U.S. Cl. ........................... 524/445; 524/444; 524/447; 524/448; 524/451; 523/200; 523/351; 428/363; 106/468; 106/470; 106/486
[58] Field of Search .................... 524/451, 444, 524/445; 523/200, 351; 428/363; 106/468

[56] References Cited

U.S. PATENT DOCUMENTS

| | | | |
|---|---|---|---|
| 4,116,897 | 9/1978 | Huszár et al. | 260/17.4 R |
| 4,131,736 | 12/1978 | Emmons et al. | 560/14 |
| 4,257,817 | 3/1981 | Mathur et al. | 106/266 |
| 4,269,761 | 5/1981 | Suhoza | 260/45.7 |
| 4,324,878 | 4/1982 | Ballard et al. | 428/363 |
| 4,431,771 | 2/1984 | Falender et al. | 524/863 |
| 4,456,710 | 6/1984 | Lüders et al. | 523/200 |
| 4,482,670 | 11/1984 | Saam et al. | 524/860 |
| 4,985,480 | 1/1991 | Fukui et al. | 524/586 |
| 5,077,328 | 12/1991 | Haruna et al. | 524/451 |
| 5,091,311 | 2/1992 | Katoh et al. | 435/119 |
| 5,571,851 | 11/1996 | Freeman et al. | 523/205 |
| 5,585,420 | 12/1996 | Grasneder et al. | 524/451 |

*Primary Examiner*—Tae Yoon
*Attorney, Agent, or Firm*—Sheridan Ross P.C.

[57] ABSTRACT

The present invention relates to a compacted mineral filler pellet and a method of making the same. The present invention also relates to a method of making a polymeric compound which includes a compacted mineral filler pellet.

19 Claims, No Drawings

COMPACTED MINERAL FILLER PELLET AND METHOD FOR MAKING THE SAME

FIELD OF THE INVENTION

This invention relates to novel, compacted mineral filler pellets and a method of making such pellets. More particularly, this invention relates to compacted mineral filler pellets which, due to the inclusion of an organic binder, or compaction additive, in the pellet, have improved performance characteristics as fillers for polymeric compounds.

BACKGROUND OF THE INVENTION

Inexpensive, chemically unreactive minerals, such as talc, are widely used as fillers in thermoplastic polymeric compounds, such as polyolefins, and in thermosets. Such fillers are commonly used to increase stiffness of a polymer.

The addition of mineral fillers to a polymer, however, can reduce the impact strength of a polymeric compound. Grinding mineral fillers to a small particle size distribution reduces this effect, but often produces a filler of very low bulk density (i.e., which is "fluffy") and which is difficult to handle during processing. Mineral fillers such as ultrafine talc are difficult to process in a polymer compounding operation, slowing output rates and creating dispersion problems in the polymer.

Compacted fillers can minimize some of the associated production problems, but other problems associated with mineral fillers may persist. These problems include thermal discoloration of the filled polymer during compounding and molding processes and poor long term heat aging (LTHA) performance of the polymeric compound. In addition, compacted fillers described prior to the present invention suffer from poor integrity of the filler pellet. Therefore, there is a need for a mineral filler with improved physical properties useful in the production of polymeric compounds.

SUMMARY OF THE INVENTION

One embodiment of the present invention is a novel compacted mineral filler pellet. Such a compact mineral filler pellet includes a mineral filler and a compaction additive which are compacted into a pellet. The compaction additive includes sulfonates (e.g., alkyl sulfonates, aryl sulfonates and alkylaryl sulfonates), amines and amides. Such a compacted mineral filler pellet has improved integrity and improved dispersion in a polymer. Such a compacted mineral filler pellet can also impart improved physical properties to a compound made with such a pellet, such as at least one of increased LTHA, less yellow coloration, increased blue coloration, increased whiteness, increased scratch resistance, improved dispersion and increased loading, which can lead to improved flex modulus (i.e., greater stiffness) and improved impact strength.

Another embodiment of the present invention is a method to make a compacted mineral filler pellet, such method including the steps of: (a) providing mineral filler particles having a median particle size of from about 0.2 μm to about 20 μm; (b) mixing the mineral filler particles with a compaction additive to form a filler/additive mixture; (c) compacting the filler/additive mixture; (d) forming the filler/additive mixture into pellets, and; (e) drying the pellets to less than about 2.0% moisture. The compaction additive which is mixed with the mineral filler includes sulfonates (e.g., alkyl sulfonates, aryl sulfonates and alkylaryl sulfonates), amines and amides.

Yet another embodiment of the present invention is a method to make a polymeric compound having improved physical properties, such method including the steps of (a) providing mineral filler particles having a median particle size of from about 0.2 μm to about 20 μm; (b) mixing the mineral filler particles with a compaction additive to form a filler/additive mixture; (c) compacting the filler/additive mixture; and (d) forming the filler/additive mixture into pellets; and (e) mixing the pellets with a polymer to form a compound, by either (i) melt processing the pellets with a polymer to make a compound and then forming (e.g., extruding) the compound or (ii) adding the pellets to a polymer to make a polymer/pellet mixture and forming the polymer/pellet mixture. In the latter process the compound can be directly formed into a desired profile (e.g., by molding or extruding) in a single step without having first to form pellets. A compound made by such a method has improved physical properties selected from the group consisting of increased LTHA, less yellow coloration, increased blue coloration, increased whiteness, increased scratch resistance, improved flex modulus and improved impact strength.

DETAILED DESCRIPTION OF THE INVENTION

The present invention relates to an improved compacted mineral filler pellet and a method for making such a compacted mineral filler pellet. The compacted mineral filler pellet of the present invention includes a compaction additive which improves the performance characteristics of the mineral filler in polymeric compounds.

More particularly, the use of a compaction additive as described herein in the compacted mineral filler pellet of the present invention results in a compacted mineral filler pellet that has greater pellet integrity than previously described mineral filler pellets. Therefore, in contrast to previously described mineral filler pellets, the improved mineral filler pellets of the present invention are less likely to fall apart (i.e., crumble), are transported more efficiently, are more efficiently loaded into the polymer and are more easily dispersable in a polymer composition. Providing the mineral filler of the present invention in the form of a compacted pellet significantly enhances output rates and improves dispersion within the polymer composition as compared to non-compacted fillers (i.e., powdered fillers).

When a compacted mineral filler pellet of the present invention is used in the production of a polymeric compound as described herein, the compound and the articles molded therefrom have improved physical properties. In particular, compounds produced using compacted mineral filler pellets of the present invention have improved color (e.g., greater brightness, and less yellowing discoloration), improved impact strength (which may be attributed to improved dispersion of the mineral filler pellets in the polymer), increased scratch resistance, and/or improved long term heat aging performance.

As used herein, a compacted mineral filler pellet is a mineral filler composition which has been compacted into pellets. Such compacted pellets are distinguishable from particulate or powdered mineral filler and from any other mineral filler compositions which are not compacted into pellets. A compacted mineral filler pellet of the present invention is produced by combining a mineral filler and a compaction additive such that intimate contact of the mineral filler and compaction additive is achieved, the mixture of which is compacted into pellets.

It is to be noted that the terms "a" or "an" entity can refer to one or more of that entity; for example, a compaction additive can refer to one or more compaction additives or at least one compaction additive. As such, the terms "a" (or "an"), "one or more" and "at least one" can be used interchangeably herein.

A compacted mineral filler pellet of the present invention includes a mineral filler. Suitable mineral fillers include, but are not limited to, silicate minerals. Preferred silicate minerals include, but are not limited to, talc, clays, kaolin, montmorillate, bentonite, and wollastonite. In a preferred embodiment, a mineral filler of the present invention is talc. Preferred talc ores to use in a compacted mineral filler pellet of the present invention include talc ores from China, Canada, Australia, India, Italy, France and the United States (e.g., Vermont and Montana).

According to the present invention, a novel feature of a compacted mineral filler pellet of the present invention is that it contains a compaction additive which imparts desirable properties to the filler pellet. As used herein, a compaction additive is a chemical which is added to a mineral filler. A compaction additive can be a liquid or a solid at room temperature and is mixed with a mineral filler, for example, alone (e.g. as a liquid or a melted solid) or in solution. In one embodiment, a compaction additive is added to mineral filler in an aqueous solution. The mixture of the mineral filler and the compaction additive is compacted, or pelletized, to form a compacted mineral filler pellet of the present invention. The moisture is preferably removed from the compacted mineral filler pellet (e.g., by evaporation) prior to the addition of the compacted mineral filler pellet to a polymer.

Without being bound by theory, the present inventors believe that the compaction additive described herein imparts improved properties to the compacted mineral filler because the compaction additive chemically binds to the surface of the mineral filler. Therefore, the compaction additive can not be easily physically stripped from the filler. In theory, if the surface of a mineral filler is acidic, such a mineral filler may act as a Lewis acid and accept electrons from a compaction additive (e.g., a sulfonate ion) in a nucleophilic substitution reaction. Therefore, compaction additives useful in the production of a compacted mineral filler pellet of the present invention preferably provide good leaving groups for such a nucleophilic substitution reaction. In other words, a compaction additive of the present invention has at least one functional group that will react with the surface of the mineral filler to insure that the additive is bound to the surface of the filler. Such binding of the additive to the mineral filler can improve the color and the long term heat aging resistance of a molded compound made with such a mineral filler. In addition, a mineral filler of the present invention with a compaction additive bound to the surface improves a compound's resistance to scratch whitening, particularly in a polyolefin compound.

A compaction additive of the present invention preferably includes an arylsulfonate, an alkylsulfonate, an arylalkylsulfonate, a fatty acid amide and/or a fatty acid amine. As used herein, a fatty acid amide or a fatty acid amine are an amide or an amine having a straight chain aliphatic substituent (R), e.g., RCONR'R" and RNR'R", respectively, where R' and R" can be H or an organic group.

More preferably, a compaction additive of the present invention is an alkali metal or an alkaline earth metal salt of an arylsulfonate, an alkylsulfonate, an arylalkylsulfonate or a fatty acid amide and/or a fatty acid amine. Even more preferably, a compaction additive of the present invention is an alkali metal or an alkaline earth metal salt of an arylsulfonate, an alkylsulfonate and/or an arylalkylsulfonate. Preferred alkali metals are lithium, sodium and potassium. Preferred alkaline earth metals are magnesium, calcium, barium and strontium. In one embodiment of the present invention, a compaction additive is sodium alkylsulfonate.

In one embodiment of the present invention, a compaction additive is a fatty acid amide or a fatty acid amine. When a mineral filler pellet of the present invention containing an amide or an amine compaction additive is compounded into a polymer, the resulting compound and the articles molded therefrom have improved scratch resistance, or resistance to scratch whitening. The scratch resistance of a compound can be measured by any scratch resistance test, including by an Erichsen scratch test or a Byk Gardner scratch test. In such a scratch test, the scratch resistance of a compound increases as the score increases. Typically, a compound made with non-compacted mineral filler without a compaction additive or with a compacted mineral filler without a compaction additive has a score of about 3 from such a scratch test. A compound made with a compacted mineral filler pellet of the present invention has an increased scratch resistance which is equivalent to a score of at least about 5, preferably at least about 7, and even more preferably at least about 9 in such a scratch test.

In a preferred embodiment, an amide compaction additive of the present invention includes a long chain fatty acid amide. Preferably, the long chain fatty acid includes at least 14 carbon atoms. More preferably, such a fatty acid amide is a saturated fatty acid amide or a mono-unsaturated fatty acid amide. Most preferably, an amide compaction additive of the present invention is an oleyl amide or an erucamide.

One advantage of a compacted mineral filler pellet of the present invention is that it can be compacted to a high density. Prior to the novel improvement of providing a compacted filler pellet including a compaction additive of the present invention, fillers were typically found to have a loose bulk density of about 6 pounds per cubic foot. With the addition of a compaction additive as described herein, mineral filler pellets of the present invention are compacted to at least about 40 pounds per cubic foot, and more preferably, to about 45 pounds per cubic foot, and even more preferably, to about 50 pounds per cubic foot. This advantage, combined with the advantage that a compacted mineral filler pellet of the present invention can be more rapidly fed to a polymer, can result in a high percent loading of the mineral filler into the polymer. The increased loading of a mineral filler into a polymer can result in improved flex modulus of the resulting compound. This is because the mineral filler improves the stiffness of the compound, therefore, more filler results in a compound with greater stiffness. Another advantage of a compacted mineral filler pellet of the present invention is decreased dust generation.

As discussed above and in the Examples section, the present inventors believe, without being bound by theory, that a compaction additive, as disclosed herein, chemically binds to the mineral filler and thereby improves the properties of the filler. As such, a compaction additive improves the integrity of the compacted mineral filler pellet. The integrity, or strength, of a compacted mineral filler pellet can be measured by any means for measuring strength, including by an ASTM D 1937-95 test. As discussed above, the improved density and compaction of a compacted mineral filler pellet of the present invention can increase the production output rate during compounding of polymers using such pellets as fillers, because more filler can be delivered to production more efficiently and more quickly, and because such pellets are more easily dispersable in a polymer composition.

Another advantage of a compacted mineral filler pellet of the present invention is that it is easier to disperse in a polymer than non-compacted mineral fillers with or without a compaction additive or compacted mineral fillers without a compaction additive. The improved dispersion of the mineral filler in the polymer results in a more homogeneous mixture of filler and polymer. Without being bound by theory, the present inventors believe that better dispersion of filler in a polymer results in a compound having greater impact strength. In one embodiment of the present invention, another advantage of such improved dispersion of the mineral filler in the polymer is that a compacted mineral filler pellet can be added directly to a polymer during the compound forming step (e.g., the extrusion step), eliminating the step of compounding the polymer with the mineral filler prior to the forming step.

Compounds made using compacted mineral filler pellets containing a compaction additive of the present invention have improved long term heat aging (LTHA) performance compared to compounds made without such an additive. In particular, compacted mineral filler pellets of the present invention increase the LTHA of a compound at least about 3 fold, and more preferably at least about 4 fold, and even more preferably at least about 5 fold, and even more preferably at least about 6 fold, over compounds made with non-compacted mineral filler without a compaction additive or compacted mineral filler without a compaction additive.

Yet another advantage of using compacted mineral filler pellets of the present invention in the production of a compound is that the resulting compound has less discoloration in long term heat aging than compounds made with non-compacted mineral filler without a compaction additive or compacted mineral filler without a compaction additive. A compacted mineral filler pellet of the present invention preferably minimizes discoloration of molded polymeric compounds during processing and during use.

In particular, compounds made using compacted mineral filler pellets of the present invention are more "white" than compounds made with non-compacted mineral filler without a compaction additive or compacted mineral filler without a compaction additive. The term "white" or "whiteness" can be quantified by any means for measuring the whiteness of a compound, such as by assigning a value, "L" to a compound being evaluated, wherein L=0 is black, and wherein L=100 is white. A compound made using compacted mineral filler pellets of the present invention has an increase in whiteness equivalent to an L value of at least about 2% greater, more preferably at least about 4% greater even more preferably about 6% greater, and even more preferably about 8% greater than a compound made with non-compacted mineral filler without a compaction additive or compacted mineral filler without a compaction additive.

Similarly, a compound made with compacted mineral filler pellets containing a sulfonate compaction additive can be less "yellow" than compounds made with non-compacted mineral filler without a compaction additive or compacted mineral filler without a compaction additive. "Yellow" or "yellow coloration" of a compound can be measured by any means for measuring the degree of yellow coloration of a compound. For example, a "b" value can be used to evaluate the degree of yellowness of a compound, wherein the value of b increases proportionally to the degree of yellow coloration of a compound. The value of b decreases proportionately to the degree of blue coloration of a compound. A compound made with a compacted mineral filler pellet of the present invention has decrease in yellow coloration equivalent to a "b" value of at least about 10% less yellow (i.e., 10% more blue), more preferably at least about 20% less yellow, even more preferably at least about 30% less yellow, and even more preferably at least about 40% less yellow than a compound made with non-compacted mineral filler without a compaction additive or compacted mineral filler without a compaction additive. Another means of measuring the yellow coloration of a compound is by rating a compound based on D1925 YI, or yellowness index. A compound that is "less yellow" has a lower yellowness index.

One embodiment of the present invention relates to a method to make an improved compacted mineral filler pellet. Such a method includes the steps of (a) providing mineral filler particles; (b) mixing such mineral filler particles with a compaction additive to form a mixture, such compaction additive being added to the mineral filler particles alone or in solution; (c) forming the filler/additive mixture into compacted pellets; and (d) drying the compacted pellets. Preferably, the step of mixing mineral filler particles with a compaction additive provides intimate contact between the mineral filler particles and the compaction additive such that the compaction additive can react with the surface of the mineral filler particles.

According to the present invention, mineral filler particles can be produced by any method of size reduction (e.g., crushing, milling and/or grinding of minerals). In a preferred embodiment, a mineral filler is first crushed to a particle size suitable for further processing. Crushing can be accomplished by any suitable method, and typically results in a particle size of from about 10 $\mu$m to about 0.5 inches. The crushed filler can then be ground to a particle size preferably less than about 325 mesh by a method such as grinding on a roller mill. The mineral filler can then be milled to the desired final particle size by a method such as jet milling.

A mineral filler used to produce a compacted mineral filler pellet of the present invention is preferably added to a compaction additive in the form of particles of a median particle size of from about 0.2 $\mu$m to about 20 $\mu$m. More preferably, a mineral filler of the present invention is added to a compaction additive at a median particle size of from about 0.75 $\mu$m to about 10 $\mu$m. Most preferably, a mineral filler of the present invention is added to a compaction additive in a median particle size of from about 1 $\mu$m to about 5 $\mu$m. As used herein, median particle size is defined as the particular particle diameter where exactly one half of the total mass of the sample is composed of particles having lesser diameters.

As used herein, a compaction additive can be either liquid or solid at room temperature. A solid compaction additive preferably has a low melting point. If a compaction additive of the present invention is a solid at room temperature, the compaction additive is preferably melted prior to mixing the compaction additive with the mineral filler. A compaction additive can be mixed with a mineral filler either alone (e.g., neat) or in solution. In one embodiment, a compaction additive of the present invention is in an aqueous solution.

A compaction additive is mixed with a mineral filler of the present invention in order to form a filler/additive mixture. Such a mixture is then compacted and formed into compacted mineral filler pellets of the present invention. Preferably, the mixture is formed into pellets by extrusion. The ratio of mineral filler to compaction additive is preferably from about 100:0.25 to about 100:10 by weight. More preferably, the ratio of mineral filler to compaction additive is from about 100:0.5 to about 100:1 by weight. When a compaction additive is added in solution, the ratio of mineral filler to compaction additive solution is preferably less than about 5:1 by weight, and more preferably less than about 4:1 by weight, and even more preferably less than about 3:1 by weight.

It is noted that other components can be added to the mineral filler/additive mixture prior to compacting the mineral filler into pellets; Such components can include components which further stabilize the pellet and/or which further enhance the properties of a compaction additive as described herein. Such components can include, for example, antioxidants, UV stabilizers and processing aids.

According to the present invention, a mineral filler/additive mixture is formed into compacted pellets. Pelletization of a mineral filler/additive mixture of the present invention can be accomplished by any pelletization method. Preferably, such a mixture is compacted and extruded, such as in a California pellet mill. Pellets can also be formed by chopping an extruded mixture into pellets. Preferred pellet sizes are about 0.125 to about 0.5 inch in diameter, preferably about 3/16 inch in diameter. Smaller diameter pellets can be difficult to disperse and larger diameter pellets can be too friable.

Compacted mineral filler pellets of the present invention are preferably dried to remove most of the moisture from the pellet. Preferably, pellets are dried to less than about 2% moisture, and more preferably to less than about 1% moisture, and most preferably, to less than about 0.5% moisture. Pellet drying can be accomplished by any method which achieves the desired percentage moisture content and maintains the improved characteristics of the pellet as described herein. Preferred methods of pellet drying include drying by a gas-fired flame or by electric heat. The drying can be accomplished in a fluidized bed or on a conveyor belt. Preferably, compacted mineral filler pellets of the present invention are dried until the temperature at the surface of the mineral filler is from about 100° C. to about 350° C., and more preferably, from about 150° C. to about 200° C. Most preferably, pellets are dried until the temperature at the surface of the mineral filler is about 175° C.

Another embodiment of the present invention is a method to make a compound with improved physical properties. Compacted mineral filler pellets of the present invention are used as a filler in the production of filled polymeric compounds, also referred to herein as compounds, polymer compounds and thermoplastic compounds. A compacted mineral filler pellet of the present invention is useful in the production of such compounds including, but not limited to, polyolefins and Nylon®. Preferred polyolefins include polypropylene, rubber modified polypropylene and polyethylene. The compounds can be constructed into any physical form. Preferably, such a compound is formed into a molded article.

Compounds produced using compacted mineral filler pellets of the present invention can be prepared by any suitable methods, and can include other components in addition to the compacted mineral filler pellets of the present invention. In a preferred embodiment, compacted mineral filler pellets of the present invention are compounded with a polymer composition in a compounding extruder, melt processor or other suitable device. In another preferred embodiment, a compacted mineral filler pellet of the present invention is added directly to the polymer during the extrusion step, eliminating the step of compounding the polymer and mineral filler.

A compacted mineral filler pellet of the present invention is preferably loaded into a polymer at a concentration of from about 0.5% to about 30% mineral filler by weight of the total polymeric compound. More preferably, a compacted mineral filler pellet is added to a polymer at a concentration of from about 20% to about 25% by weight.

The following examples are provided for the purposes of illustration and are not intended to limit the scope of the present invention.

EXAMPLE 1

The following Example demonstrates that the physical properties of a compound are improved when the compound is made with compacted mineral filler pellets of the present invention.

A compound was prepared using two different sources of talc, Cimpact 710 and Arctic Mist, as mineral fillers. Each type of talc was compounded into an impact copolymer at 30% loading. The talc was compounded into the copolymer in three different forms: (i) as a non-compacted, fine powder without a compaction additive of the present invention (Samples 1 & 3); (ii) as a compacted pellet wherein the talc was compacted with water (Samples 2 & 4); and (iii) as a compacted mineral filler pellet of the present invention, wherein the talc was compacted with a compaction additive, sodium alkylsulfonate (SAS)(Samples 3 & 6). The resulting polymers were then tested for various physical properties. Table 1 illustrates the physical differences between the compounds produced with the various forms of mineral fillers.

TABLE 1

EVALUATION OF COMPACTED PRODUCTS

| | | | | | | | Tensile | | | | | |
| | | | | | | | Stress peak | Strain peak | Stress break | Strain break | Flex Modulus | Izod Impact | LTHA days |
| | | % | D1925 | Coloration (Hunter) | | | | | | | | | |
| Sample | Talc | Load | YI | L | a | b | (psi) | (%) | (psi) | (%) | (Kpsi) | (ft – lb/in) | (160 C.) |
| 1 | Cimpact 710 powder (non-compacted) | 30 | 15.0 | 67.1 | −0.25 | 3.52 | 5.8 | 3992 | 40 | 2387 | 384.2 | 1.4 | 18 |
| 2 | Cimpact 710 (compacted) | 30 | 17.3 | 65.0 | 0.15 | 4.13 | 6.1 | 3981 | 37 | 2333 | 390.6 | 1.4 | 12 |
| 3 | Cimpact 710 + SAS (compacted) | 30 | 10.7 | 70.5 | −0.67 | 2.12 | 6.7 | 3806 | 64 | 1665 | 374.9 | 2.3 | 53 |

TABLE 1-continued

EVALUATION OF COMPACTED PRODUCTS

| | | | | Coloration (Hunter) | | | Tensile | | | | Flex Modulus | Izod Impact | LTHA days |
|---|---|---|---|---|---|---|---|---|---|---|---|---|---|
| | | % | D1925 | | | | Stress peak | Strain peak | Stress break | Strain break | | | |
| Sample | Talc | Load | YI | L | a | b | (psi) | (%) | (psi) | (%) | (Kpsi) | (ft − lb/in) | (160 C.) |
| 4 | Arctic Mist powder (non-compacted) | 30 | 20.5 | 59.6 | 0.31 | 4.84 | 6.0 | 4080 | 51 | 2161 | 405.1 | 1.4 | 16 |
| 5 | Arctic Mist (compacted) | 30 | 20.6 | 59.4 | 0.24 | 4.86 | 5.9 | 4022 | 39 | 2315 | 413.0 | 1.4 | 13 |
| 6 | Arctic Mist + SAS (compacted) | 30 | 17.5 | 61.5 | −0.20 | 4.12 | 6.4 | 3865 | 78 | 1475 | 395.7 | 2.5 | 46 |

Coloration was scored in a Hunter test by three parameters: L, which is a measure of whiteness (0=black, 100=white); a, which is a measure of red/green hue (redness increases with the value of a); and b, which is a measure of yellowness (yellowness increases with the value of b). Each compound was also assigned a D1925 YI value (yellowness index). For both the Cimpact 710 and the Arctic Mist talc, when the talc was compounded with the polymer as a compacted mineral filler pellet of the present invention (Samples 3 & 6), the resulting compound scored higher for whiteness (L) and was less yellow (b or D1925 YI) than the corresponding compounds made with powdered (non-compacted) talc without a compaction additive (Samples 1 & 4), or with compacted talc without a compaction additive (Samples 2 & 5).

Izod impact is a measure of the tendency of a polymer to behave in a brittle manner. The Izod impact test is well known in the art. A higher Izod impact score indicates that a compound is less brittle, since it can sustain greater force without breaking. The Izod impact strength was significantly increased in the compounds which were made with either Cimpact 710 or Arctic Mist pellets which were compacted with sodium alkylsulfonate (Samples 3 & 6), in contrast to the corresponding compounds made with powdered (non-compacted) talc without a compaction additive (Samples 1 & 4), or with compacted talc without a compaction additive (Samples 2 & 5). Therefore, compounds made with a compacted mineral filler pellet of the present invention are less brittle.

The compounds were molded and tested for long term heat aging (LTHA, measured in days at 160° C.). Again, the compounds made from either Cimpact 710 or Arctic Mist talc, wherein the talc was in the form of compacted pellets of the present invention (Samples 3 & 6) had significantly increased LTHA in contrast to compounds made with non-compacted talc without a compaction additive (Samples 1 & 4) or with compacted talc without a compaction additive (Samples 2 & 5). Therefore, compounds made with a compacted mineral filler pellet of the present invention have increased resistance to long term heat aging.

In summary, Example 1 demonstrates that a compacted mineral filler pellet of the present invention increases the whiteness, decreases the yellow coloration, increases the Izod impact strength, and increases the long term heat aging resistance of a compound.

EXAMPLE 2

The following Example demonstrates that the physical properties of a compound are improved when the compound is made with compacted mineral filler pellets of the present invention.

A polymer was compounded with a talc, Cimpact 699, either in powder (non-compacted) or pelletized (compacted) form as described in Example 1. The talc was compounded into an impact copolymer at 27–30% loading. It should be noted that the target for loading was 30%. Samples 2 and 4 could only be loaded to 20% and 27%, respectively. On the other hand, Samples 3 and 5 could have been loaded even higher than 30%. An amide compaction additive, which is a condensation product of diethanolamine and lauric acid, was either i) compacted with the talc into a compacted mineral filler pellet of the present invention, which was subsequently compounded with a polymer to form a compound (Samples 3 & 5), or; ii) blended with the talc, but not compacted into a pellet, and added directly to the polymer during the compounding process (Samples 2 & 4). The compaction additive was added to the talc or to the polymer at 0.5% or 1.0% by weight. Table 2 shows a comparison of the physical properties of the resulting compounds.

TABLE 2

EVALUATION OF SURFACE TREATED CIMPACT 699

| | | | | Hunter | | | Tensile | | Flex Modulus | Izod Impact | LTHA days |
|---|---|---|---|---|---|---|---|---|---|---|---|
| | | % | D1925 | | | | Stress | Strain | | | |
| Sample | Surface Treatment | Load | YI | L | a | b | peak (psi) | peak (%) | (Kpsi) | (ft − lb/in) | (160° C.) |
| 1 | Cimpact 699 powder no treatment | 30 | 18.3 | 60.8 | −0.33 | 4.39 | 3889 | 6.5 | 374.6 | 2.5 | 4 |
| 2 | Cimpact 699 powder + 0.5% Amide | 29 | 19.6 | 64.5 | −0.45 | 5.21 | 3913 | 6.6 | 364.6 | 1.8 | 22 |

TABLE 2-continued

EVALUATION OF SURFACE TREATED CIMPACT 699

| Sample | Surface Treatment | % Load | D1925 YI | Hunter L | a | b | Tensile Stress peak (psi) | Strain peak (%) | Flex Modulus (Kpsi) | Izod Impact (ft – lb/in) | LTHA days (160° C.) |
|---|---|---|---|---|---|---|---|---|---|---|---|
| 3 | Cimpact 699 + 0.5% Amide (compacted) | 30 | 21.0 | 63.4 | -0.02 | 5.46 | 3908 | 6.4 | 381.2 | 2.3 | 20 |
| 4 | Cimpact 699 powder + 1.0% Amide | 27 | 21.4 | 63.1 | 0.12 | 5.54 | 3883 | 7.0 | 347.5 | 2.4 | 22 |
| 5 | Cimpact 699 + 1.0% Amide (compacted) | 30 | 23.7 | 62.3 | 0.51 | 6.12 | 3940 | 6.4 | 384.8 | 2.4 | 20 |

Table 2 demonstrates the improvements obtained by compacting the compaction additive directly with the mineral filler (talc) to form a compacted mineral filler pellet of the present invention, as opposed to adding the compaction additive at a later stage in the process, such as adding it to the polymer with the talc during the compounding process. Loading levels for the samples wherein the talc is compacted with an amide compaction additive (Samples 3 & 5) are higher than the corresponding samples where the amide compaction additive is added directly to the compound (i.e., not compacted with the talc) (Samples 2 & 4). In other words, when the amide was not compacted with the talc into a compacted mineral filler pellet of the present invention, this resulted in less filler being loaded into the polymer.

The compounds which were made with an amide-compacted mineral filler pellet of the present invention (Samples 3 and 5) have a greater flex modulus (i.e., better strength or stiffness) than the corresponding samples wherein the compaction additive is added directly to the polymer (i.e., not compacted with the talc) during compounding (Samples 2 & 4) or when no compaction additive is used (Sample 1). This is due to the decrease in loading measured for Samples 2 & 4.

This example demonstrates that the compacted mineral filler pellets of the present invention which contain a compaction additive have a higher loose bulk density than when the talc and compaction additive are not compacted. This translates to greater loadings of the mineral filler and better stiffness of the resulting compound.

EXAMPLE 3

The following Example demonstrates that the physical properties of a compound are improved when the compound is made with a compacted mineral filler pellet of the present invention.

A polymer was compounded with a talc, Cimpact 699, either in powder (non-compacted) or pelletized (compacted) form as described in Examples 1 and 2. A compaction additive, sodium arylsulfonate, was either i) compacted with the talc into a compacted mineral filler pellet of the present invention, which was subsequently compounded with a polymer to form a compound (Samples 3 & 5), or; ii) added directly to the polymer with the talc in non-compacted form during the compounding process (Samples 2 & 4). The compaction additive was added at 0.5% or 1.0% by weight. Table 3 shows a comparison of the physical properties of the resulting compounds.

TABLE 3

EVALUATION OF SURFACE TREATED CIMPACT 699

| Sample | Surface Treatment | % Load | D1925 YI | Hunter L | a | b | Tensile Stress peak (psi) | Strain peak (%) | Flex Modulus (Kpsi) | Izod Impact (ft – lb/in) | LTHA days (160° C.) |
|---|---|---|---|---|---|---|---|---|---|---|---|
| 1 | Cimpact 699 no treatment (non-compacted) | 30 | 18.3 | 60.8 | -0.33 | 4.39 | 3889 | 6.5 | 374.6 | 2.5 | 4 |
| 2 | Cimpact 699 + 0.5% SAS (non-compacted) | 30 | 15.6 | 64.2 | -0.81 | 3.84 | 3895 | 6.7 | 365.9 | 2.6 | 25 |
| 3 | Cimpact 699 + 0.5% SAS (compacted) | 30 | 15.7 | 65.4 | -0.83 | 3.98 | 3891 | 6.4 | 376.8 | 2.6 | 24 |
| 4 | Cimpact 699 + 1.0% SAS (non-compacted) | 30 | 15.1 | 64.8 | 0.80 | 3.69 | 3898 | 6.7 | 361.5 | 2.7 | 36 |
| 5 | Cimpact 699 + 1.0% SAS (compacted) | 30 | 15.2 | 65.4 | 0.85 | 3.77 | 3852 | 6.7 | 369.7 | 2.7 | 34 |

The compounds which were made with a sodium arylsulfonate-compacted mineral filler pellet of the present invention (Samples 3 and 5) have a greater flex modulus (i.e., better stiffness) than the corresponding samples wherein the compaction additive is added directly to the polymer (i.e., not compacted with the talc) during compounding (Samples 2 & 4).

Therefore, compounds made with a compacted mineral filler pellet of the present invention can have improved stiffness over compounds made without the compacted mineral filler pellet due to increased loading.

EXAMPLE 4

The following Example shows that compaction additives mixed with mineral fillers of the present invention are chemically bound to the mineral filler.

A talc, Cimpact 699, was mixed with compaction additive: an alkylsulfonate (Samples 3 & 4), an amide (Samples 5 & 6), or an amine (Samples 7 & 8). Two samples included talc which was compacted with water (Samples 1 & 2). Each combination of talc and compaction additive was either extracted with acetone (Samples 2, 4, 6 & 8) or not extracted (Samples 1, 3, 5 & 7) and all samples were pelletized. Compounds made with the compacted mineral filler pellets were tested for long term heat aging (LTHA) properties. The results are shown in Table 4.

TABLE 4

ACETONE EXTRACTIONS OF SURFACE TREATMENTS ON CIMPACT 699

| Sample | Loading(%) | Surface Treatment(1%) | Acetone Extraction | LTHA (160° C.) Days |
|---|---|---|---|---|
| 1 | 20 | None | No | 4 |
| 2 | 20 | None | Yes | 4 |
| 3 | 20 | SAS | No | 34 |
| 4 | 20 | SAS | Yes | 31 |
| 5 | 20 | Amide | No | 30 |
| 6 | 20 | Amide | Yes | 27 |
| 7 | 20 | Amine | No | 29 |
| 8 | 20 | Amine | Yes | 26 |

Table 4 shows that acetone extraction of the talc/additive mixture does not significantly change the LTHA of a compound which has been made with a compacted mineral filler pellet of the present invention, which indicates that the mineral filler additive is bound to the talc.

EXAMPLE 5

The following Example demonstrates that a compound which is made with a compacted mineral filler which includes an amide or amine compaction additive of the present invention has improved scratch resistance compared to a compound made using compacted mineral filler without a compaction additive.

A compound was prepared using talc as a mineral filler. The talc was compacted into a mineral filler pellet with either i) water (Sample 1); ii) 1% sodium alkylsulfonate (Sample 2); iii) 1% amine (Sample 3); or iv) 1% erucamide (Sample 4). The compacted mineral filler pellets were compounded into an impact copolymer at 30% loading. The resulting compounds were then tested for scratch resistance by the Erichsen scratch test as shown in Table 5.

TABLE 5

Evaluation of Scratch Resistance

| Sample | Talc Surface Treatment | Scratch Number (Newtons) |
|---|---|---|
| 1 | None | 2–3 |
| 2 | SAS | 2–3 |
| 3 | Amine | 5 |
| 4 | Erucamide | 9 |

Table 5 shows that compounds made with compacted mineral filler pellets of the present invention having an amine or an amide as a compaction additive have significantly improved scratch resistance over compounds made without a compaction additive of the present invention.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A compacted mineral filler pellet, consisting essentially of a mineral filler selected from the group consisting of talc, clay, kaolin, montmorillate, bentonite and wollastonite, and a compaction additive compacted into a pellet, wherein said compaction additive is selected from the group consisting of sulfonates, amines and amides.

2. The compacted mineral filler pellet of claim 1, wherein said mineral filler is talc.

3. The compacted mineral filler pellet of claim 1, wherein said compaction additive is selected from the group consisting of an alkali metal salt and an alkaline earth metal salt of said sulfonates.

4. The compacted mineral filler pellet of claim 1, wherein said compaction additive is sodium alkylsulfonate.

5. The compacted mineral filler pellet of claim 1, wherein said compaction additive is a long chain fatty acid amide selected from the group consisting of oleyl amide and erucamide.

6. The compacted mineral filler pellet of claim 1, wherein said compacted mineral filler pellet has a bulk density of at least about 40 pounds per cubic foot.

7. The compacted mineral filler pellet of claim 1, wherein said compacted mineral filler pellet improves at least one physical property of a polymeric compound comprising said compacted mineral filler pellet, said physical property selected from the group consisting of whiteness, coloration, scratch resistance and resistance to long term heat aging (LTHA).

8. The compacted mineral filler pellet of claim 1, wherein the inclusion of said compacted mineral filler pellet in a polymeric compound increases resistance to long term heat aging (LTHA) of said polymeric compound by at least about 3 fold compared to a compound made without said compacted mineral filler pellet.

9. The compacted mineral filler pellet of claim 1, wherein the inclusion of said compacted mineral filler pellet in a polymeric compound increases the whiteness of said compound equivalent to an increased L value of at least about 2% greater than an L value of a compound made without said compacted mineral filler pellet.

10. The compacted mineral filler pellet of claim 1, wherein the inclusion of a compacted mineral filler pellet containing a sulfonate compaction additive in a polymeric compound decreases the yellow coloration of said compound equivalent to a decreased b value of at least about 10% less than a b value of a compound made without said compacted mineral filler pellet.

11. The compacted mineral filler pellet of claim 1, wherein the inclusion of a compacted mineral filler pellet containing an amide or an amine compaction additive in a polymeric compound results in said compound having a scratch resistance equivalent to an Erichsen scratch test score of at least about 5.

12. A method to make a compacted mineral filler pellet, comprising:
   (a) providing mineral filler particles having a median particle size of from about 0.2 μm to about 20 μm, wherein said mineral filler particles are selected from the group consisting of talc, clay, kaolin, montmorillate, bentonite and wollastonite;
   (b) mixing said mineral filler particles with a compaction additive to form a filler/additive mixture, wherein said compaction additive is selected from the group consisting of sulfonates, amines and amides;
   (c) forming said filler/additive mixture into compacted mineral filler pellets in the absence of a polymer; and
   (d) drying said pellets to less than about 2.0% moisture.

13. The method of claim 12, wherein the ratio of said mineral filler to said compaction additive is from about 100:0.25 to about 100:10 by weight.

14. The method of claim 12, wherein said step of drying said pellets is performed until the temperature at the surface of said mineral filler is from about 100° C. to about 350° C.

15. A method to make a polymeric compound having improved physical properties, comprising:
   (a) providing mineral filler particles having a median particle size of from about 0.2 μm to about 20 μm, wherein said mineral filler particles are selected from the group consisting of talc, clay, kaolin, montmorillate, bentonite and wollastonite;
   (b) mixing said mineral filler particles with a compaction additive to form a filler/additive mixture, wherein said compaction additive is selected from the group consisting of sulfonates, amines and amides;
   (c) forming said filler/additive mixture into compacted mineral filler pellets in the absence of a polymer; and
   (d) mixing said pellets with a polymer to form a compound, wherein said compound has at least one improved physical property selected from the group consisting of increased long term heat aging (LTHA), less yellow coloration, increased blue coloration, increased whiteness and increased scratch resistance.

16. The method of claim 15, wherein said step of mixing said pellets comprises a method selected from the group consisting of:
   (a) melt-processing said pellets with a polymer to make a compound and extruding said compound; and
   (b) adding said pellets, to a polymer to make a polymer/pellet mixture and forming said polymer/pellet mixture.

17. The method of claim 15, wherein said polymer is selected from the group consisting of polyolefins and nylon.

18. The method of claim 15, wherein said compound has at least one improved physical property selected from the group consisting of increased whiteness equivalent to an increased L value of at least about 2% greater than the L value of a compound made without said compacted mineral filler pellets, decreased yellow coloration equivalent to a decreased b value of at least about 10% less than a b value of a compound made without said compacted mineral filler pellet, a resistance to long term heat aging (LTHA) at least about 3 fold greater than a compound made without said compacted mineral filler pellet, and a scratch resistance equivalent to an Erichsen scratch test score of at least about 5.

19. The compacted mineral filler pellet of claim 1, wherein said compacted mineral filler pellet further comprises a component selected from the group consisting of antioxidants, UV stabilizers and processing aids.

* * * * *